(12) United States Patent
Smith

(10) Patent No.: US 9,924,135 B1
(45) Date of Patent: Mar. 20, 2018

(54) RULES-BASED SYSTEMS AND METHODS FOR VIDEO VISITATION

(71) Applicant: Securus Technologies, Inc., Dallas, TX (US)

(72) Inventor: Matthew Richard Smith, McKinney, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 13/764,470

(22) Filed: Feb. 11, 2013

(51) Int. Cl.
*H04N 7/14* (2006.01)
*H04N 7/15* (2006.01)

(52) U.S. Cl.
CPC ..................... *H04N 7/15* (2013.01)

(58) Field of Classification Search
None
See application file for complete search history.

(56) References Cited

U.S. PATENT DOCUMENTS

| | | | | |
|---|---|---|---|---|
| 8,761,360 B1 * | 6/2014 | Gongaware | ............ | H04M 3/38 379/142.05 |
| 8,832,374 B1 * | 9/2014 | Schaefers | ........... | H04L 67/1097 711/115 |
| 2007/0285504 A1 * | 12/2007 | Hesse | ...................... | H04N 7/15 348/14.08 |
| 2008/0000966 A1 * | 1/2008 | Keiser | ................... | G06Q 10/10 235/382 |
| 2008/0201158 A1 * | 8/2008 | Johnson | ............. | H04M 3/2281 705/1.1 |
| 2009/0076832 A1 * | 3/2009 | Collins | .................. | G06Q 10/00 705/1.1 |
| 2011/0047473 A1 * | 2/2011 | Hanna | .................... | G06Q 10/06 715/740 |
| 2011/0214153 A1 * | 9/2011 | Rosenfeld | ................ | H04N 7/15 725/78 |
| 2012/0281058 A1 * | 11/2012 | Laney | .................... | H04N 7/147 348/14.03 |
| 2013/0066546 A1 * | 3/2013 | Meisels et al. | ................ | 701/400 |
| 2013/0070045 A1 * | 3/2013 | Meek | ..................... | G06Q 10/06 348/14.07 |
| 2013/0179210 A1 * | 7/2013 | Collins | .................. | G06Q 10/00 705/7.19 |
| 2013/0263227 A1 * | 10/2013 | Gongaware | ............ | H04L 63/08 726/4 |
| 2013/0268589 A1 * | 10/2013 | Torgersrud | ............. | G06Q 10/10 709/204 |
| 2014/0192132 A1 * | 7/2014 | Avery | .................... | G06Q 10/10 348/14.01 |
| 2014/0218466 A1 * | 8/2014 | Bloms | ................... | H04N 7/152 348/14.09 |

* cited by examiner

*Primary Examiner* — Maria El-Zoobi
(74) *Attorney, Agent, or Firm* — Fogarty LLP

(57) ABSTRACT

Rules-based systems and methods for video visitation. In some embodiments, a method may include receiving a request for a video visitation between a resident and a non-resident of a controlled-environment facility, identifying, among a plurality of predetermined rules, one or more rules that are applicable to the request, and evaluating the request based upon the one or more identified rules.

20 Claims, 6 Drawing Sheets

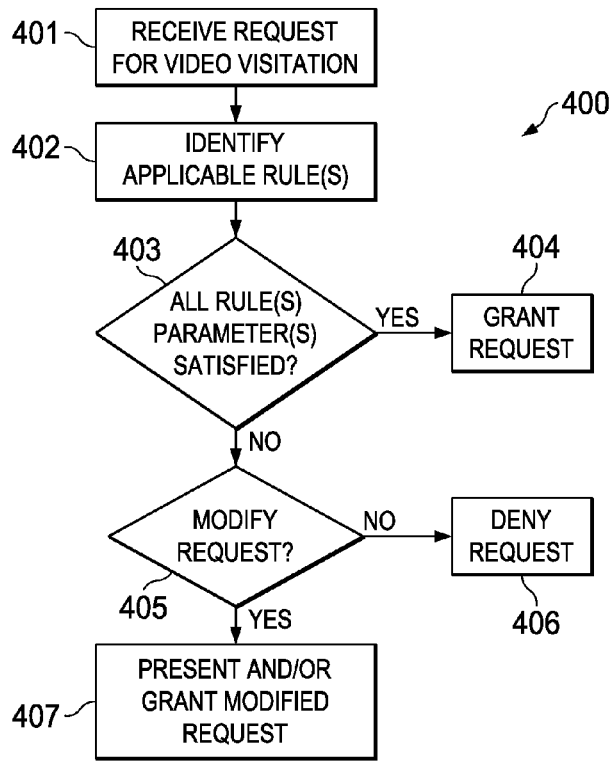
FIG. 4
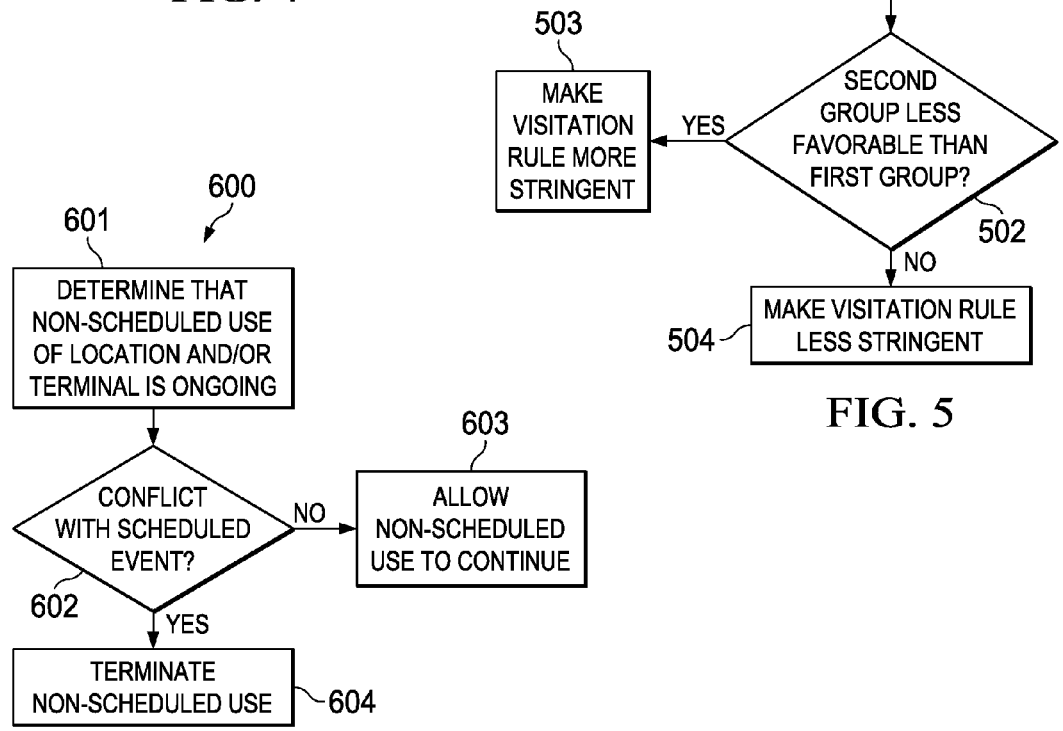
FIG. 5
FIG. 6

RULES-BASED SYSTEMS AND METHODS FOR VIDEO VISITATION

TECHNICAL FIELD

This specification relates to rules-based systems and methods for video visitation.

BACKGROUND

In the United States, prison inmates have certain visitation rights. By allowing prisoners to have some contact with the outside world while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including videoconferences and electronic chat sessions.

SUMMARY

Embodiments disclosed herein are directed to rules-based systems and methods for video visitation. In an illustrative, non-limiting embodiment, a method may include receiving a request for a video visitation between a resident and a non-resident of a controlled-environment facility, identifying, among a plurality of predetermined rules, one or more rules that are applicable to the request, and evaluating the request based upon the one or more identified rules. In some cases, the resident may originate request. Alternatively, the non-resident may originate the request.

The method may also include granting the request in response to the evaluation determining that the request conforms with the one or more identified rules. Conversely, the method may include denying the request in response to the evaluation determining that the request does not conform with the one or more identified rules. In some cases, the method may further include modifying the request in response to the evaluation determining that the request does not conform with the one or more identified rules, presenting the modified request to the resident or the non-resident, and granting the modified request in response to the resident or the non-resident accepting the modified request.

For example, the request may include two or more of: an identification of the resident, an identification of the non-resident, a date of the video visitation, a time of the video visitation, a duration of the video visitation. Additionally or alternatively, the request may include one or more of: an identification of one or more of a plurality of different locations for the video visitation within the controlled-environment facility, or an identification of one or more of a plurality of different video visitation terminals within the controlled-environment facility.

In some implementations, the one or more identified rules may prescribe one or more constraints for video visitations involving at least one of: the resident or the non-resident. Moreover, the one or more constraints may be associated with a one of a plurality of predefined groups to which the resident or the non-resident belong.

The method may also include determining that the resident or non-resident has been re-classified from a first predefined group to a second predefined group during the course of the resident's incarceration in the controlled-environment facility, and making the one or more constraints more or less strict based upon the determination. The one or more constraints may indicate a maximum number or video visitations or a maximum duration of all video visitations that the resident or the non-resident are allowed to have for a given time period. Additionally or alternatively, the one or more constraints may indicate a location within the controlled-environment facility or video visitation terminal within the controlled-environment facility.

In another illustrative, non-limiting embodiment, a method may include receiving a request for a video visitation between a resident and a non-resident of a controlled-environment facility, identifying, among a plurality of predetermined rules, one or more rules that are applicable to the request; and (a) granting the request in response to the request conforming with the one or more identified rules; or (b) denying the request in response to the request not conforming with the one or more identified rules.

The method may also include identifying a conflict between a scheduled video visitation and a non-scheduled event and causing the non-scheduled event to be terminated prior to the scheduled visitation. The non-scheduled event may be taking place in a same video visitation terminal to be used during the scheduled video visitation. Additionally or alternatively, the non-scheduled event may be taking place in an area within the controlled-environment facility where the video visitation terminal to be used during the scheduled video visitation is located.

In another illustrative, non-limiting embodiment, yet another method may include receiving a request for a video visitation between a resident and a non-resident of a controlled-environment facility, the request including parameters selected from the group consisting of: an identification of the resident, an identification of the non-resident, a date of the video visitation, a time of the video visitation, a duration of the video visitation, an identification of one or more of a plurality of different locations for the video visitation within the controlled-environment facility, and an identification of one or more of a plurality of different video visitation terminals within the controlled-environment facility, identifying a rule that is applicable to the request, determining that at least one of the parameters does not conform with the rule, and modifying the request to make the at least one parameter conform with the rule.

In some cases, the method may include presenting the modified request to the resident or the non-resident. The method may also include granting the modified request in response to the resident or the non-resident accepting the modified request.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Reference will now be made to the accompanying drawings:

FIG. 4 is a flowchart of an example of a method for processing video visitation requests according to some embodiments.

FIG. 5 is a flowchart of an example of a method for modifying video visitation rules according to some embodiments.

FIG. 6 is a flowchart of an example of a method for handling a conflict between a non-scheduled activity and a scheduled video visitation according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses rules-based systems and methods for video visitation. Generally speaking, the various techniques described herein may find applicability in a wide variety of controlled-environment facilities (as well as outside of controlled-environment facilities). Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the embodiments discussed below, a controlled-environment facility may be referred to as a jail or prison, and its residents may be referred to as residents, arrestees, detainees, or inmates. It should be understood, however, that the systems and methods described herein may be similarly applicable to other types of controlled-environment facilities and their respective residents (e.g., a hospital and its patients).

Figure 1:
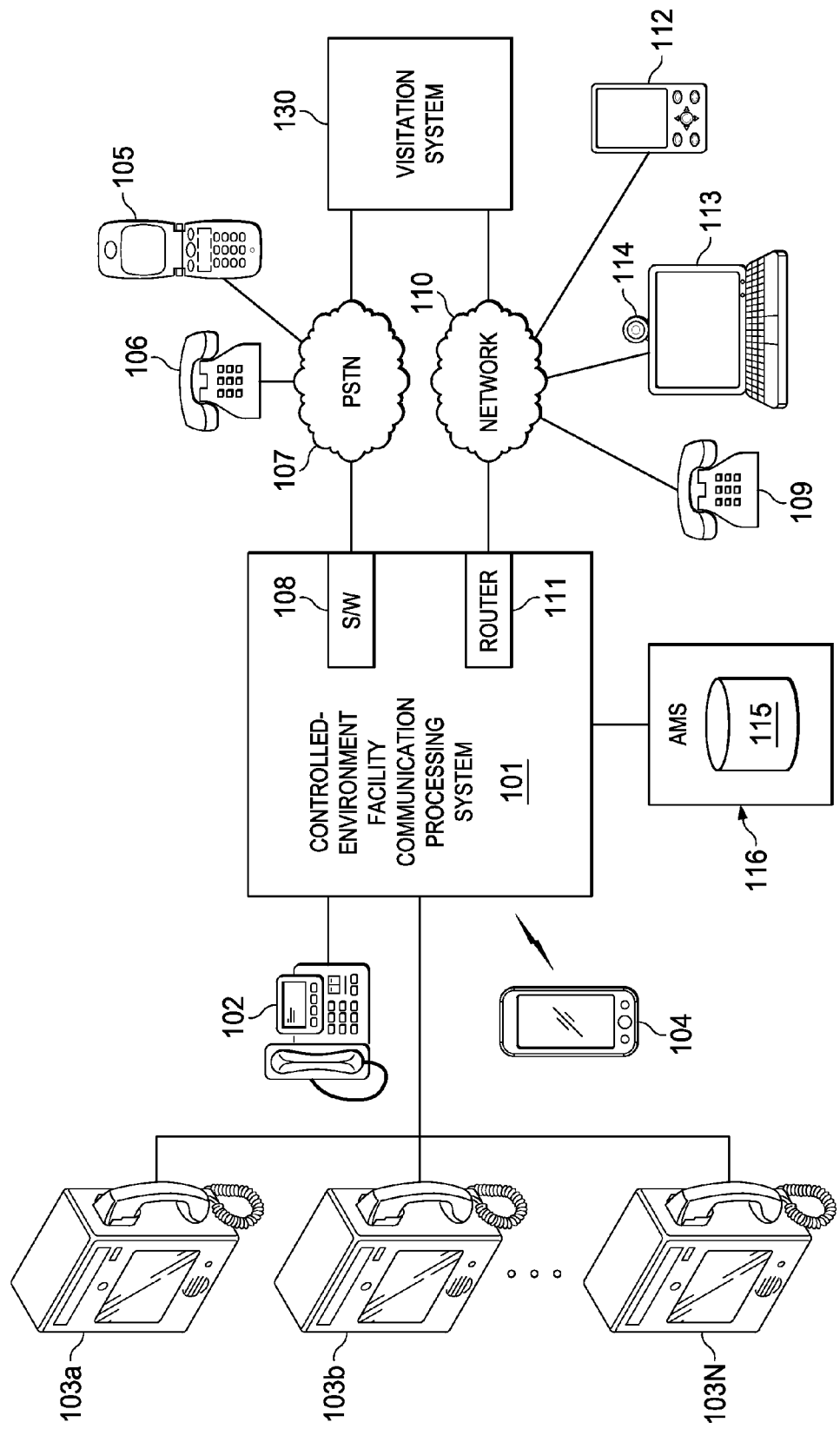
FIG. 1 is a block diagram of an example of an environment where a visitation system may be employed according to some embodiments.

Turning now to FIG. 1, a block diagram of an illustrative environment where a visitation system may be employed is depicted according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a personal computer wireless device 104 to access such services. For example, an inmate may initiate telephone services by lifting the receiver on telephone 102, at which time the inmate may be prompted to provide a personal identification number (PIN), other identifying information or biometrics. An interactive voice response (IVR) unit (not shown) may generate and play prompt or other messages to inmates on devices 102 and/or 104.

Under the control of communication processing system 101, devices 102 and 104 may be capable of connecting to a non-resident's (i.e., a person not committed to a controlled-environment facility) device 105 or telephone 106 across a publicly switched telephone network (PSTN) 107. For example, device 105 may be a mobile phone, whereas telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a call connection to destination telephone 109 or device 112.

Video visitation devices 103a-n (each collectively referred to as "video visitation device 103") may have video conferencing capabilities to enable inmates to participate in video visitation sessions with non-residents of the correctional facility via video call, secure online chat, etc. For example, a non-resident party may have a personal or laptop computer 113 with camera 114 (or a cell phone, tablet computer, etc.). Additionally or alternatively, device 112 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. Generally speaking, each video visitation device 103 may be disposed in a visitation room, in a pod, kiosk, etc.

In addition to providing certain visitation and communication operations, communication processing system 101 may attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in database 115 maintained by Administration and Management System (AMS) 116. In addition to PAC list(s), AMS 116 may also store inmate or resident profile data (RPD), as well as visitation rules applicable to each inmate.

As an example, in the context of a correctional facility, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more gateways, switches and/or routers (not shown). Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within system 101.

In some implementations, communication system 101 may be configured to perform video visitation monitoring operations configured to monitor and or record video visitations (e.g., as electronic video files). In scenarios where communication system 101 is located within the controlled-environment facility, it may have direct access to AMS 116. In other embodiments, however, communication system 101 may be located remotely with respect to the controlled-environment facility, and access to AMS 116 may be obtained via a computer network such as, for example, network 110.

In some embodiments, video visitation devices 103 may be implemented as a computer-based system. For example, each of video visitation devices 103 may include a display, camera, and handset. The display may be any suitable electronic display such as, for example, a Liquid Crystal Display (LCD), a touchscreen display (e.g., resistive, capacitive, etc.), or the like, whereas the camera may be an suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone).

During a video visitation session, video visitation devices 103 may be configured to capture a video image of an inmate to be transmitted to a non-resident using the camera, and to display a video image of the non-resident to the inmate using the display. Video visitation devices 103 may also be configured to capture an audio signal from the inmate to be transmitted to a non-resident using the mouthpiece portion of the handset, and to provide an audio signal from the non-resident to the inmate using the earpiece portion of the handset. Additionally or alternatively, audio received from the non-resident may be reproduced via a loudspeaker, and audio provided by the inmate may be captured via a microphone.

In some cases, video visitation devices 103 may assume the form of any computer, tablet computer, smart phone, etc., or any other consumer device or appliance with videoconferencing capabilities.

Figure 2:
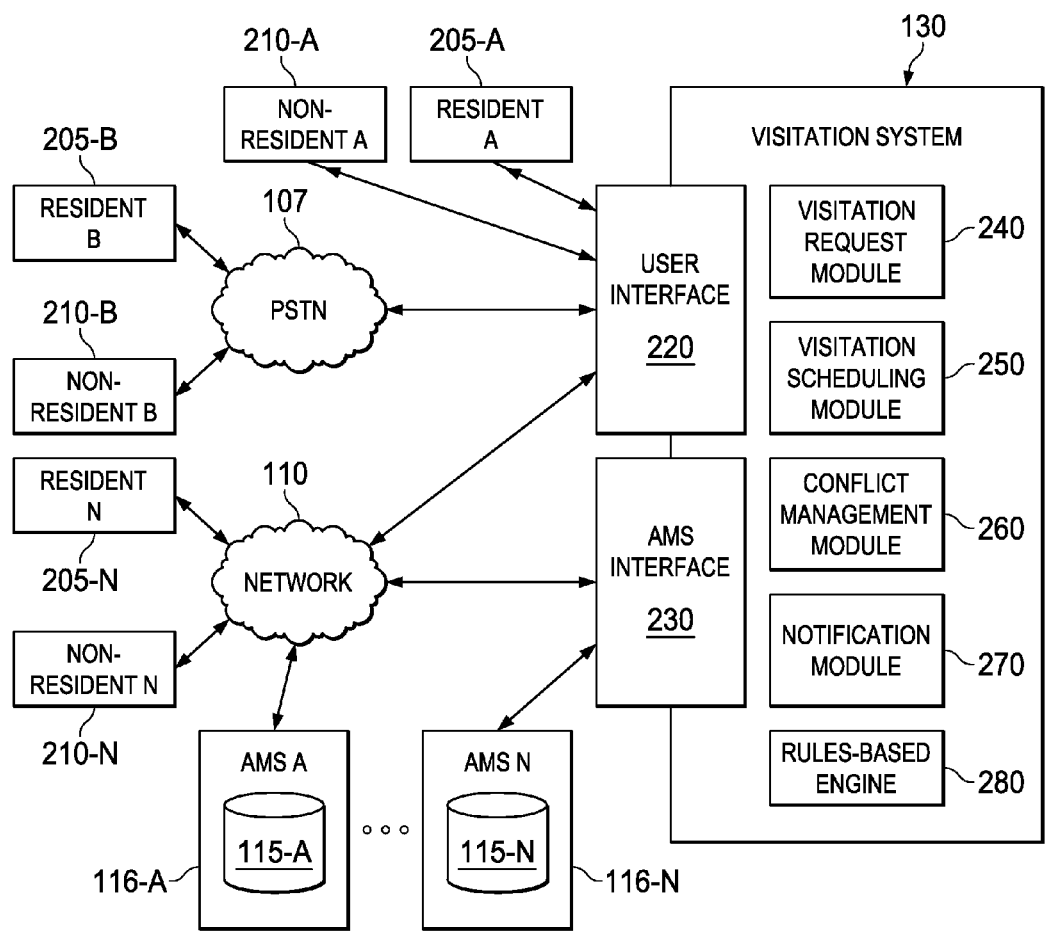
FIG. 2 is a diagram of an example of a video visitation system according to some embodiments.

Referring to FIG. 2, a block diagram of system 130 for providing visitation services to residents of a controlled-environment facility is depicted according to some embodiments. As shown, visitation system 130 includes user interface 220 and AMS interface 230. In some embodiments, residents and/or non-residents of one or more controlled-environment facilities may access, interact with, or otherwise use visitation system 130 via user interface 220. For example, user interface 220 may be provided as a web interface, IVR interface, or the like.

In some scenarios, resident 205-A and/or non-resident 210-A may connect to visitation system 130 via user interface 220. For example, resident 205-A and/or non-resident 210-A may directly or indirectly (e.g., through an officer or personnel of the controlled-environment facility) reach a computer terminal or a telephone disposed within a controlled-environment facility and request visitation services. In other scenarios, resident 205-B and/or non-resident 210-B may interact with user interface 220 via PSTN 107 using an IVR system or the like. Additionally or alternatively, resident 205-N and/or non-resident 210-N may access a website, webpage, Internet portal, etc. via a computer network or Internet 110, for example, using a personal computing device (e.g., running a web browser), cell phone (e.g., via an "app"), prison terminal, or any other suitable client device.

When implemented to support web-based interactions, user interface 220 may be deployed using a number of suitable techniques. For example, user interface 220 may be implemented using Hypertext Markup Language (HTML), Common Gateway Interface (CGI), Javascript, PHP, Perl, C/C++, or any suitable combination of these or other commercial, open source and/or proprietary languages, frameworks or development environments for generating and distributing web-based information. Further, in some implementations, a request and response data may be exchanged between a client and visitation system 130 through the use of messages or documents formatted in eXtensible Markup Language (XML) or other platform-independent data format. For example, in some embodiments, a web services request to provide visitation services may be embodied in an XML document including fields identifying the person(s) that will be participating in the visitation, the type, time, and/or duration of the visitation, and possibly other fields, in which each field is delimited by an XML tag describing the type of data the field represents. In other implementations, web services-related documents may be transmitted between applications making requests and targeted web services using a web-based data transfer protocol, such as a version of the Hypertext Transfer Protocol (HTTP), for example.

In some embodiments, visitation system 130 may interact with one or more AMS systems 116A-N either directly or via a computer network such as the Internet 110. As previously noted, each AMS system 116A-N may each include its own database 115A-N, respectively. Generally speaking, databases 115A-N may include any suitable type of application or data structure that may be configured as a persistent data repository. For example, databases 115A-N may be configured as relational databases that include one or more tables of columns and rows and that may be searched or queried according to a query language, such SQL or the like. Alternatively, databases 115A-N may be configured as structured data stores that include records formatted according to a markup language, such as XML or the like. In other embodiments, databases 115A-N may be implemented using one or more arbitrarily or minimally structured files managed and accessible through a corresponding type of application.

In addition to interfaces 220 and 230, visitation system 130 includes visitation request module 240, visitation scheduling module 250, conflict management module 260, notification or communication module 270, and rules-based engine (or simply "engine" 280). Visitation request module 240 may be configured to receive one or more visitation scheduling requests, modification requests, or cancellation requests, for example, via user interface 220. Visitation scheduling module 250 may be configured to execute an incoming request, for example, by scheduling a new visitation, modifying a previously scheduled visitation, or canceling the previously scheduled visitation. Conflict management module 260 may be configured to identify conflicts or potential conflicts between or among different requests, and to resolve those conflicts. Notification module 270 may be configured to notify of a particular visitation, modification, cancelation, conflict, etc.

Rules-based engine 280 may be configured to store a plurality of rules usable by one or more request module 240, visitation scheduling module 250, conflict management module 260, or notification module 270 during the course of their respective operations. For example, engine 280 may store one or more scheduling rules that allows (or prohibits) certain persons to perform a scheduling operation. Those rules may be applied to incoming visitation requests by visitation request module 240. Also, engine 280 may include other rules regarding notifications or conflict resolution operations that may be employed by notification module 270 or conflict management module 260, respectively. These, and other techniques, are illustrated in more detail below in connection with FIGS. 4-8.

In various embodiments, modules 220-280 shown in FIG. 2 may represent sets of software routines, logic functions, and/or data structures that are configured to perform operations described herein and particularly with respect to FIGS. 4-8. Although these modules are shown as distinct logical blocks, in other embodiments at least some of the functionality provided by these modules may be combined into fewer blocks. Conversely, one or more of modules 220-280 may be implemented such that it is divided among two or more logical blocks. Moreover, although shown with a particular configuration, in other embodiments these various modules may be rearranged in other ways.

Also, in certain embodiments, each of the different components of visitation system 130 may be implemented in software, hardware or a suitable combination thereof, in an integrated fashion (e.g., on a single server or computer system) or in a distributed fashion (e.g., via a number of discrete systems configured to communicate with one another via a network). Additionally or alternatively, the operation of visitation system 130 may be partitioned into components in a different fashion than illustrated in FIG. 2.

Figure 3:
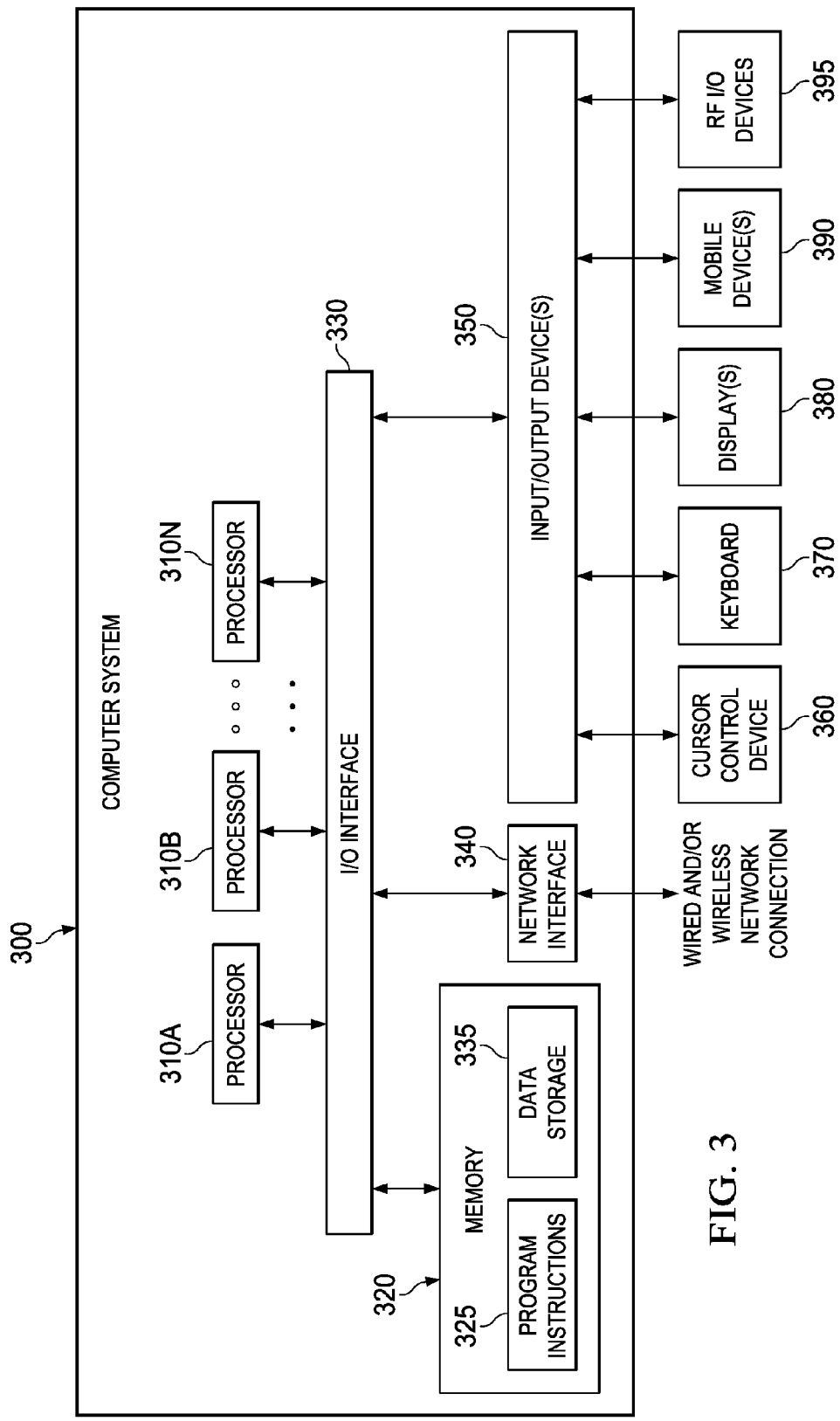
FIG. 3 is a block diagram of an example of a computer system configured to implement various systems and methods described herein according to some embodiments.

As noted above, embodiments of rules-based systems and methods for video visitation may be implemented or executed, at least in part, by one or more computer systems. One such system is illustrated in FIG. 3. In various embodiments, system 300 may be a server, a workstation, a desktop computer, a laptop, a tablet computer, a mobile device, a smart phone, or the like. In some cases, system 300 may be used to implement video visitation system 130.

As illustrated, computer system 300 includes one or more processors 310A-N coupled to a system memory 320 via an input/output (I/O) interface 330. Computer system 300 further includes a network interface 340 coupled to I/O interface 330, and one or more I/O devices 350, such as cursor control device 360, keyboard 370, display(s) 380, mobile device(s) 390, and/or Radio Frequency (RF) I/O devices 395. Each of I/O devices 350 may be capable of communicating with computer system 300, for example, via a wired connection (e.g., serial port, Universal Serial Bus port) or wireless connection (e.g., Wi-Fi, Bluetooth, Near Field Communications Link, etc.) Other devices may include, for example, surveillance cameras, microphones, antennas/wireless transducers, phone detection modules, etc. In some embodiments, each of visitation system 130, AMS 116, communication processing system 101, devices 102-104, and/or devices 105, 106, 109, 112, and 113 may be implemented using a single instance of computer system 300, while in other embodiments multiple such systems, or multiple nodes making up computer system 300, may be configured to host different portions of a given electronic device or system.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described below in connection with FIGS. 4-8, may be stored within system memory 320 as program instructions 325 and data storage 335, respectively. In other embodiments, program instructions and/or data may be received, sent or stored upon different types of computer-accessible media or on similar media separate from system memory 320 or computer system 300.

Generally speaking, a computer-accessible medium may include any tangible or non-transitory storage media or memory media such as electronic, magnetic, or optical media—e.g., disk or CD/DVD-ROM coupled to computer system 300 via I/O interface 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments some or all of the functionality of I/O interface 330, such as an interface to system memory 320, may be incorporated directly into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 350 may, in some embodiments, include one or more display terminals, keyboards, keypads, touchpads, scanning devices, voice or optical recognition devices, mobile devices, or any other devices suitable for entering or retrieving data by one or more computer system 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data may be accessible by program instructions 325. In an embodiment, program instructions 325 may include software elements of embodiments illustrated in the above figures. For example, program instructions 325 may be implemented in various embodiments using any desired programming language, scripting language, or combination of programming languages and/or scripting languages (e.g., C, C++, C#, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Turning now to FIG. 4, a flowchart of method 400 for processing video visitation requests is depicted. In some embodiments, method 400 may be performed, at least in part, by video visitation system 130 of FIG. 1. As shown, at block 401, method 400 may include receiving a request for video visitation from a resident and/or from a non-resident of a controlled-environment facility. Such a request may be received, for example, via user interface 220 at visitation request module 240 of visitation system 130. In some cases, the request for visitation may be received in a format such as, for example, via the Internet (e.g., as an HTTP message or the like), by e-mail, text message, Short Message Service (SMS) communication, telephone call, IVR input, etc.

When received from a resident, the request may specify one or more individual non-residents (e.g., by first and last name, by telephone number, by address, by driver's license or social security number, etc.) with whom the resident wishes to have a video visitation session. Conversely, when received from a non-resident, the request may specify one or more individual residents (e.g., by inmate identification number, by name, by driver's license or social security number, etc.) with whom the non-resident wishes to have the video visitation session. Additionally or alternatively, the request may identify a category of or group of individuals, such as, for example, "siblings," "parents," "lawyers," "bail bondsmen," etc.

Additionally or alternatively, the request may indicate a desired date of the video visitation, a desired time of the video visitation, and/or a desired duration of the video visitation. Additionally or alternatively, the request may include an identification of one of a plurality of controlled-environment facilities, an identification of one or more of a plurality of different locations for the video visitation within a given controlled-environment facility, or an identification of one or more of a plurality of different video visitation terminals within the given controlled-environment facility.

Still at block 401, visitation scheduling module 250 may receive the incoming request and make one or more determinations about the desired video visitation. For example, when the request identifies a category of individuals (as opposed to one or more particular individuals), visitation scheduling module 250 may identify a list of persons whose visitation is being requested. In an embodiment, visitation scheduling module 250 may interact with one or more of databases 115A-N to determine a list of available lawyers and/or bail bondsman for an inmate. In some implementations, the identified list may be specifically suited for the requesting inmate's particular circumstances (e.g., visitation scheduling module 250 may return only a list of DWI lawyers if the inmate is being charged with DWI, as revealed by other data stored the inmate's resident profile data or RPD).

At block 402, method 400 may include identifying one or more predetermined rule(s) that is/are applicable to the request. For example, rules-based engine 280 may determine the identity of the resident and/or non-resident that will participate in the video visitation based upon the request, and may retrieve one or more rules that are associated with that resident and/or non-resident. Additionally or alternatively, rules-based engine 280 may determine the desired date, time, and/or duration of the video visitation identified in the video visitation request, and it may retrieve one or more rules that associated with the date, time, and/or duration. Additionally or alternatively, rules-based engine 280 may determine the identification the controlled-environment facility, location, and/or terminal within the given controlled-environment facility in the video visitation request, and it may retrieve one or more rules that associated with the facility, location, resident, non-resident, and/or terminal.

In some embodiments, these one or more rules may prescribe one or more constraints for video visitations involving the resident and/or the non-resident, as well as one or more constraints associated with a one of a plurality of predefined groups or categories to which the resident or the non-resident belong. Examples of groups or categories of residents include, for instance, general population inmates, inmates that belong or a suspected to belong to a particular gang or (criminal) organization, inmates that have had good behavior or are otherwise designated as "trustees," etc.

For example, in some implementations, inmates or groups of inmates may generally be designated as "trustees" after proving to officials in their correctional facilities that they can be trusted to do one or more of: (a) reliably perform one or more tasks, (b) show on time, (c) not attempt to escape, etc. In some cases, depending upon the circumstances and facility's regulations, an inmate may have had to serve a certain amount of his or her sentence to be eligible for trustee status; which may also be restricted based upon the inmate's prior or current conviction(s) (e.g., convicted murderers may not be eligible for trustee status).

Still referring to block 402, again, each rule may have one or more constraints. These constraints may indicate, for example, a maximum number or video visitations or a maximum duration of all video visitations that a resident or non-resident is/are allowed to have for a given time period. For instance, a particular inmate may only have 1 hour of video visitation available per month, whereas another inmate may have 2 hours of video visitation available per week. Additionally or alternatively, a given inmate may have the opportunity to participate in up to 2 distinct video visitation sessions per week and a maximum number of visitations of 1 per day, while a different inmate may only be allowed to participate in 1 video visitation session per week, with a maximum of 2 per month. Any other suitable restrictions may be similarly placed upon different non-residents and/or groups or categories of non-residents.

In other embodiments, rule constraints may indicate a location within a controlled-environment facility or video visitation terminal within the controlled-environment facility where a resident and/or non-resident may (or may not) conduct the video visitation. For example, a particular inmate may be prohibited to participate in a video visitation session from one or more predetermined prison locations, or the inmate may only be allowed to participate in the session from other certain location(s). Similarly, an inmate and/or non-resident may only be allowed to participate in a session while operating a particular terminal or device, or may be prohibited from using a given device. In some cases, locations within a controlled-environment facility may be identified by wing, area, or cell. Meanwhile, terminals may be identified by serial number, Internet Protocol (IP) address, Media Access Control (MAC) address, or the like.

As such, each rule may have one or more constraints or parameters, and each such constraint may include a value (sometimes referred to as an attribute-value pair). At block 403, method 400 may include analyzing parameters within the video visitation request against rule parameters to determine whether they are all satisfied. For example, at block 403 method 400 may determine that a requesting resident or non-resident is allowed to conduct video visitation with the identified resident or non-resident, that the day, time, and/or duration of the requested visitation do not violate constraints associated with the resident and/or non-resident, and/or that the location and/or terminal cited in the request are allowed.

It should be noted that these various parameters or attributes may be correlated against any other parameter or attribute depending upon the nature of the rules set up by the controlled-environment facility. For example, to determine whether a particular terminal selected in a video visitation request is appropriate, rules-based engine 280 may compare the terminal's ID against a list of other terminals, against a list of residents allowed to manipulate or access the terminal, and/or against a time or day of the visitation when the terminal may be used. For example, in some cases, certain terminals may be undergoing maintenance at predetermine days and/or times, and those days and/or times may be blacklisted via a corresponding rule.

At block 404, if all rule parameters are satisfied, visitation scheduling module 250 may schedule the requested video visitation. Otherwise, at block 405, visitation scheduling module 250 may make certain visitation scheduling determinations that may cause it to modify or otherwise add parameters or values to the original video visitation request. For example, if the request for video visitation does not specify a desired day, time, and/or duration, method 400 may determine one or more appropriate days, times, and/or durations for the particular resident and/or non-resident based, at least in part upon information stored in databases 115A-N. Then, notification module 270 may notify the interested or affected parties to the video visitation.

In other cases, a resident's visitation history may also be stored in AMS systems 116A-N and accessed by visitation scheduling module 250 via AMS interface 230, for example, in order to determine whether visitations limits have been reached and/or to resolve certain scheduling conflicts. Additionally or alternatively, in the absence of express visitation rules provided by AMS 116A-N, visitation scheduling module 250 may evaluate databases 115A-N and/or other information to create its own visitation rules with respect to a particular resident of a controlled-environment facility. For instance, visitation scheduling module 250 may determine, based on a residents' RPD information, that the resident has a upcoming legal hearing and/or medical appointment, and may automatically allocate additional visitation for that resident.

At block 406, if there is no acceptable way of modifying the request to make it conform to the identified rules, then the request may be denied. Otherwise, at block 407, method 400 may present the modified request to the resident and/or non-resident, and, if accepted by the resident and/or non-resident, visitation scheduling module 250 may grant the modified request and schedule the video visitation as modified.

FIG. 5 is a flowchart of a method 500 for modifying video visitation rules is depicted. In some embodiments, method 500 may be performed, at least in part, by video visitation system 130 of FIG. 1. At block 501, method 500 may include determining that the resident or non-resident has been reclassified from a first predefined group to a second predefined group during the course of the resident's incarceration in the controlled-environment facility. Then, at block 502, method 500 may determine whether the second group has a less favorable standing or otherwise has fewer privileges than the first group. For example, if an inmate in the general population has been determined to be a gang member, the inmate is expected to receive fewer privileges (that is, the answer to the inquiry in block 502 would be "yes"). Conversely, if the same inmate is instead designated as a trustee, he or she may receive more privileges (that is, the answer to the inquiry in block 502 would be "no").

At block 503, if the second group has a less favorable standing within the controlled-environment facility, then a given video visitation rule may be made more stringent. For example, instead of having 4 hours of video visitation per month, the inmate may receive only 1 hour; instead of being able to schedule video visitations for any day or time, the inmate may be restrict to certain day(s) and/or time(s); instead of being able to have a video visitation with any non-resident of his choice, the inmate may be limited to certain categories of persons (e.g., family, lawyers, etc.); instead of being able to use his or her own video visitation device (e.g., a tablet computer), the inmate may be required to attend the video visitation from a designated video visitation area inside the controlled-environment facility, etc.

Conversely, if the second group has a more favorable standing within the controlled-environment facility, method 500 may make one or more visitation rules less stringent. For example, instead of having the ability to schedule 1 video visitation per week, the inmate may be allowed to schedule 2 visitations per week; instead of being restricted to certain days, times, locations, or terminals, the inmate may be given a wider range of scheduling options; and so on.

In some cases, visitation scheduling module 250 may detect the presence of a conflict or a potential conflict and may pass control to conflict management module 260. In that regard, FIG. 6 is a flowchart of method 600 for handling a conflict between a non-scheduled activity and a scheduled video visitation. Again, in some embodiments, method 600 may be performed, at least in part, by video visitation system 130 of FIG. 1.

At block 601, method 600 may include determining that non-scheduled use of location and/or terminal within the controlled-environment facility is ongoing. For example, an inmate may be using a particular terminal to conduct a commissary transaction, obtain certain information, etc. at the same time that a scheduled video visitation over that same terminal is supposed to take place. Thus, at block 602, method 600 may include determining that a conflict between the scheduled video visitation and the non-scheduled use or event is likely to happen (e.g., a non-scheduled inmate is using a terminal a predetermined amount of time prior to the beginning of a scheduled video visitation). If there is no conflict, then at block 603, method 600, may allow the non-scheduled use to continue. Otherwise, at block 604, method 600 may terminate the non-scheduled use (e.g., by providing a visual or audible warning to the non-scheduled inmate, etc.).

It should be understood that the various operations described herein, particularly in connection with FIGS. 4-6, may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

In various embodiments, the systems and methods described herein may be configured or otherwise accessible to administrators, officers, etc. of a controlled-environment facility ("users") via a web console, dedicated software application, or the like. To illustrate these embodiments, FIGS. 7 and 8 are screenshots of examples of graphical user interfaces for video visitation systems.

Figure 7:
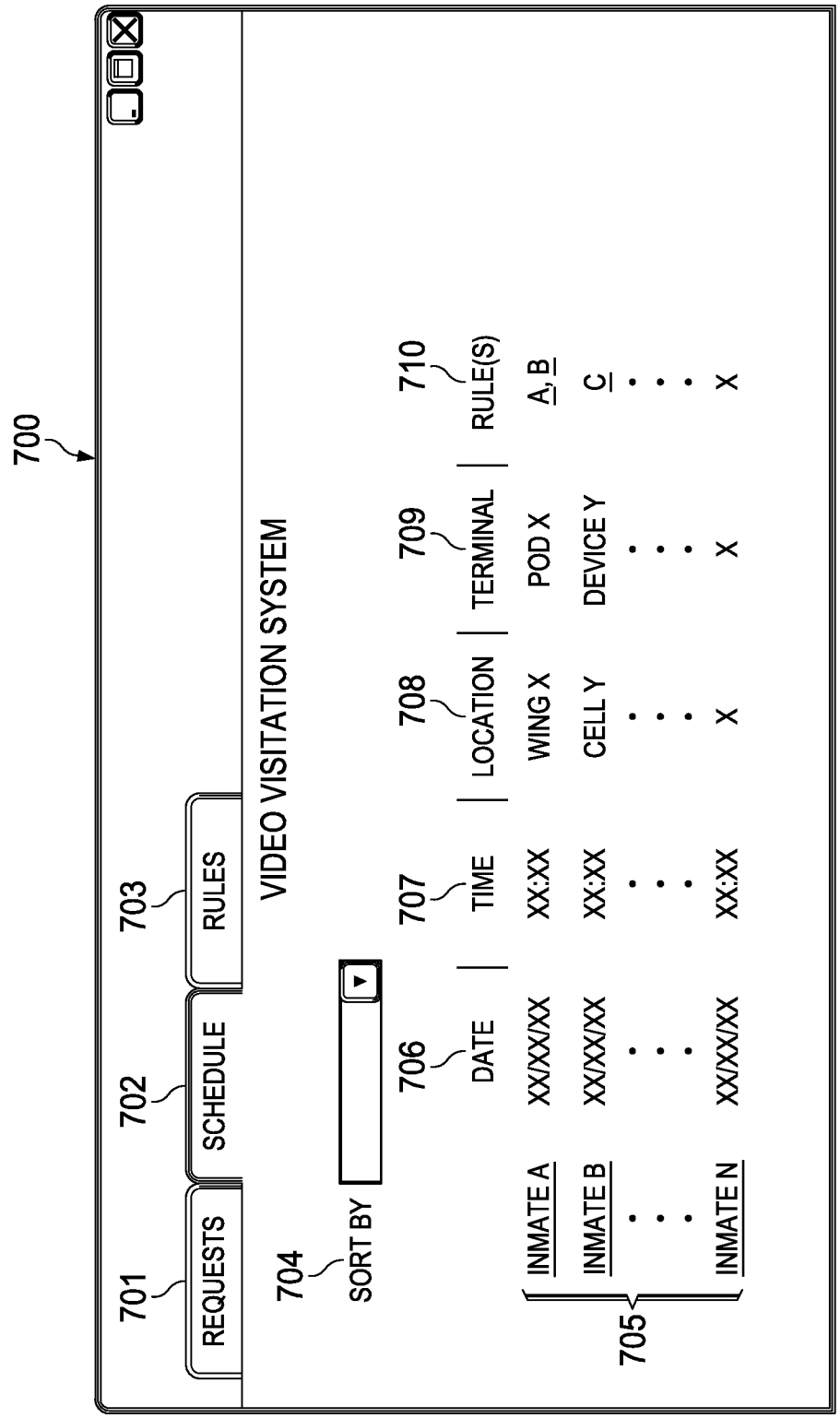
FIGS. 7 and 8 are screenshots of examples of graphical user interfaces for video visitation systems according to some embodiments.

Particularly, FIG. 7 shows interface 700 that includes navigation elements or tabs 701-702 that enable the user to navigate between requests, schedule, and/or rules, respectively. In this case, the user has selected the "schedule" element 702. Therefore, interface 700 may provide information about scheduled video visitations, which may be sorted using tool or menu 704, for example, by: resident, non-resident, day, time, facility, location, terminal, etc. In this example, inmate 705 sorts the information presented, and the resulting display includes columns for date 706, time 707, location (e.g., wing X, wing Y, etc.) 708, and terminal (e.g., POD X, device Y, etc.) 709 for each inmate. In addition, for each inmate, applicable video visitation rules 710 (e.g., A, B, C, etc.) are also identified.

In some embodiments, an authorized user may be capable of editing one or more of the values shown in interface 700 by clicking on the corresponding text (e.g., using a pointing device or the like) and entering a new value. In response, the modification may be validated against the applicable rules, and notification module 270 may transmit an updated message to the interested or affected parties.

Figure 8:
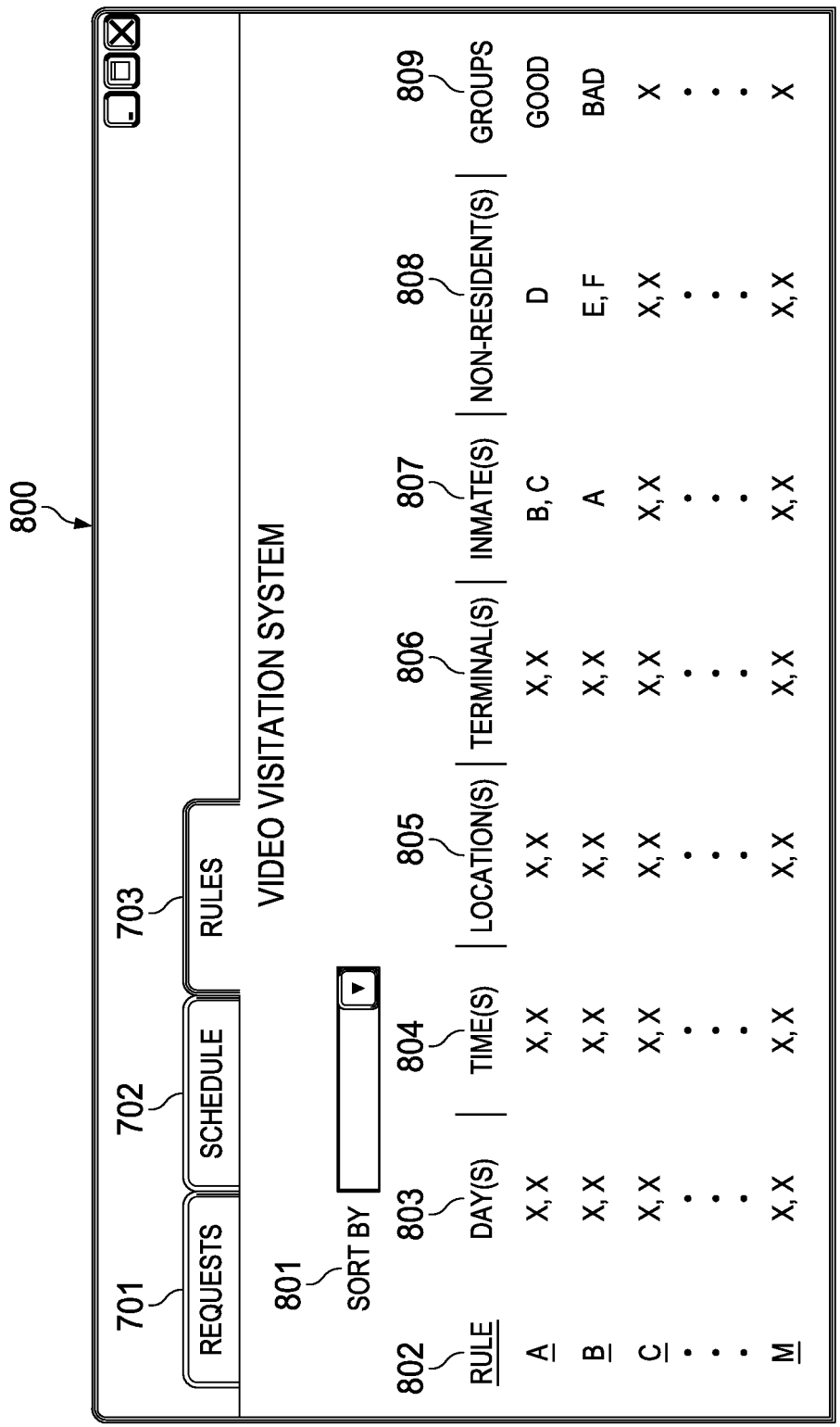

FIG. 8 shows interface 800 in response to rules tab or element 703 being selected by a user. In this illustration, a user may be allowed to search, view, or modify various visitation rules in place for a given controlled-environment facility or set of facilities. For example, the user may sort the information presented using tool or menu 801 such that it displays the existing rules by name or identifier (A, B, C, etc.). For each rule 802, interface 800 may present information regarding the constraints or parameters and corresponding values associated with those constraints. In this case, the parameters shown are day(s) 803, time(s) 804, location(s) 805, terminal(s) 806, inmate(s) 807, non-resident(s) 808, and group(s) 809. In some cases, there may also be an indication of whether or not a particular rule is active or inactive (i.e., not currently being applied or enforced).

Similarly as described above, in some embodiments, an authorized user may be capable of editing one or more of the values shown in interface 800 by clicking on the corresponding entry and entering a new value; thus effectively modifying, creating, or editing rules. In response, the notification module 270 may notify one or more affected parties.

The various systems and methods illustrated in the figures and described herein represent example embodiments. The methods may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
   performing, by one or more computer systems configured to support and control video visitations by residents of a controlled-environment facility:

schedule a video visitation between a resident and a non-resident of a controlled-environment facility, wherein the resident is classified according to a privilege status;

identifying, among a plurality of predetermined rules, one or more rules that are applicable to the scheduled video visitation, wherein the one or more rules include a video visitation allotment for the resident, and further include restrictions on communication devices that the resident is permitted to utilize for video visitations;

receiving a modification to the scheduled video visitation, wherein the modification alters the location of the scheduled video visitation within the controlled-environment facility; and evaluating the modification based upon the one or more identified rules, and based on the privilege status of the resident, wherein the evaluation modifies the video visitation allotment based on communication devices available at the new location for the video visitation and based on the privilege status of the resident.

2. The method of claim 1, further comprising:
performing, by the one or more computer systems:
re-scheduling the video visitation in response to the evaluation determining that the modified visitation allotment permits the video visitation at the new location.

3. The method of claim 1, further comprising:
performing, by the one or more computer systems:
cancelling the video visitation in response to the evaluation determining that the modified visitation allotment does not permit visitations at the new location.

4. The method of claim 1, further comprising:
performing, by the one or more computer systems:
presenting the modified video visitation allotment to the resident or the non-resident; and
re-scheduling the video visitation in response to the resident or the non-resident accepting the modified video visitation allotment.

5. The method of claim 1, wherein the modification specifies two or more of: an identification of the resident, an identification of the non-resident, a date of the video visitation, a time of the video visitation, a duration of the video visitation.

6. The method of claim 1, wherein the modification specifies one or more of: an identification of one or more of a plurality of different locations for the video visitation within the controlled-environment facility, or an identification of one or more of a plurality of different video visitation terminals within the controlled-environment facility.

7. The method of claim 1, wherein the one or more identified rules prescribe one or more constraints for video visitations involving at least one of: the resident or the non-resident.

8. The method of claim 7, wherein the one or more constraints are associated with a one of a plurality of predefined groups to which the resident or the non-resident belong.

9. The method of claim 1, further comprising:
performing, by the one or more computer systems:
determining that the resident has been re-classified from a first privilege status classification to a second privilege status classification during the course of the resident's incarceration in the controlled-environment facility; and
making the one or more constraints more or less strict based upon the determination.

10. The method of claim 7, wherein the video visitation allotment indicates a maximum number of video visitations in a given time period or a maximum duration of all video visitations that the resident is allowed in a given time period.

11. A video visitation system, comprising:
at least one processor; and
a memory coupled to the at least one processor, the memory configured to store program instructions executable by the at least one processor to cause the video visitation system to:
schedule a video visitation between a resident and a non-resident of a controlled-environment facility, wherein the resident is classified according to a privilege status and wherein video visitation limits are associated with the privilege status classification;
identify, among a plurality of predetermined rules, one or more rules that are applicable to the scheduled video visitation, wherein the one or more rules include video visitation limits for the resident, and further include restrictions on video visitation terminals that the resident is permitted to utilize for video visitations;
receive a modification to the scheduled video visitation, wherein the modification alters the location of the scheduled video visitation within the controlled-environment facility;
modify the video visitation allotment based on video visitation terminals available at the new location for the video visitation and based on the privilege status of the resident; and
re-scheduling the video visitation in response to determining that the modified visitation allotment permits the video visitation at the new location.

12. The video visitation system of claim 11, the program instructions further executable by the at least one processor to cause the video visitation system to:
identify a conflict between the scheduled video visitation and a non-scheduled event; and
cause the non-scheduled event to be terminated prior to the scheduled visitation.

13. The video visitation system of claim 12, wherein the non-scheduled event is taking place in a same video visitation terminal to be used during the scheduled video visitation.

14. The video visitation system of claim 12, wherein the non-scheduled event is taking place in an area within the controlled-environment facility where the video visitation terminal to be used during the scheduled video visitation is located.

15. A tangible computer-readable storage medium having program instructions stored thereon that, upon execution by a computer-based video visitation system, cause the computer-based video visitation system to:
schedule a video visitation between a resident and a non-resident of a controlled-environment facility, wherein the resident is classified according to a privilege status;
identify a rule that is applicable to the scheduled video visitation, wherein the one or more rules include a video visitation allotment for the resident, and further include restrictions on communication devices that the resident is permitted to utilize for video visitations;

receive a modification to one the scheduled video visitation, wherein the modification alters the location of the scheduled video visitation within the controlled-environment facility;

modify the video visitation allotment applicable to the resident based on the communication devices available at the new location for the video visitation;

determine that the privilege status of the resident does not conform with the identified rule, including the modified video visitation allotment of the resident; and modify the scheduled video visitation such that the privilege status of the resident conforms with the identified rule.

16. The tangible computer-readable storage medium of claim 15, wherein the program instructions, upon execution, further cause the computer-based video visitation system to present the modified scheduled video visitation to the resident or the non-resident.

17. The tangible computer-readable storage medium of claim 16, wherein the program instructions, upon execution, further cause the computer-based video visitation system to grant the modified scheduled video visitation in response to the resident or the non-resident accepting the modified scheduled video visitation.

18. The method of claim 1, wherein the modifications to the scheduled video visitation includes changes to a visitation area within the controlled-environment facility.

19. The method of claim 1, wherein the modifications to the scheduled video visitation includes changes to the video visitation terminal to be used by the resident.

20. The method of claim 1, wherein the modifications to the scheduled video visitation includes changes to the time of the visitation.

* * * * *